United States Patent
Adib

(10) Patent No.: US 9,752,381 B2
(45) Date of Patent: Sep. 5, 2017

(54) PRIVACY SCREEN SYSTEM

(71) Applicant: Frank Adib, Jacksonville, FL (US)

(72) Inventor: Frank Adib, Jacksonville, FL (US)

(*) Notice: Subject to any disclaimer, the term of this patent is extended or adjusted under 35 U.S.C. 154(b) by 5 days.

(21) Appl. No.: 14/941,141

(22) Filed: Nov. 13, 2015

(65) Prior Publication Data

US 2017/0138125 A1    May 18, 2017

(51) Int. Cl.
| | |
|---|---|
| *E06B 9/08* | (2006.01) |
| *A47H 5/00* | (2006.01) |
| *E06B 3/48* | (2006.01) |
| *E06B 3/94* | (2006.01) |
| *E06B 9/06* | (2006.01) |
| *E06B 9/42* | (2006.01) |
| *G06F 1/16* | (2006.01) |
| *E06B 9/24* | (2006.01) |
| *E06B 9/40* | (2006.01) |

(52) U.S. Cl.
CPC .............. *E06B 9/42* (2013.01); *G06F 1/1603* (2013.01); *E06B 2009/2488* (2013.01); *E06B 2009/405* (2013.01)

(58) Field of Classification Search
CPC .............. E06B 2009/2488; E06B 9/40; E06B 2009/405; E06B 9/115; E06B 9/42; G06F 1/1603; G06F 1/1307; G06F 1/1611; G06F 1/1601; G06F 1/1607

USPC .... 160/242, 243, 245, 134, 24, 370.22, 262; 359/612

See application file for complete search history.

(56) References Cited

U.S. PATENT DOCUMENTS

| | | | | |
|---|---|---|---|---|
| 1,385,131 | A | * | 7/1921 | Horn ........................ B60J 3/02 160/262 |
| 3,386,106 | A | * | 6/1968 | Clemens ................ A47H 21/00 160/84.07 |
| 5,325,970 | A | | 7/1994 | Dillon et al. |
| 5,400,903 | A | | 3/1995 | Cooley |
| 5,717,566 | A | | 2/1998 | Tao |
| 5,905,546 | A | | 5/1999 | Giulie et al. |
| 6,046,754 | A | | 4/2000 | Stanek |
| 6,152,567 | A | | 11/2000 | LaForgia |
| D457,359 | S | | 5/2002 | Chan |
| 7,134,758 | B1 | | 11/2006 | Baker |
| 7,303,077 | B2 | | 12/2007 | Harlocker |
| 7,508,657 | B1 | * | 3/2009 | Smith ................... G06F 1/1601 361/679.24 |
| 2006/0266482 | A1 | | 11/2006 | Montano |
| 2010/0027208 | A1 | * | 2/2010 | Wang ................... G06F 1/1607 361/679.21 |

* cited by examiner

*Primary Examiner* — Katherine Mitchell
*Assistant Examiner* — Jeremy Ramsey

(57) ABSTRACT

A privacy screen system for inhibiting an extraneous observer from viewing a display on an electronic device includes an electronic device that has a display and the display may be viewed. A pair of screens is provided and each of the screens is removably coupled to the electronic device. Thus, each of the screens inhibits an extraneous observer from viewing the display.

13 Claims, 4 Drawing Sheets

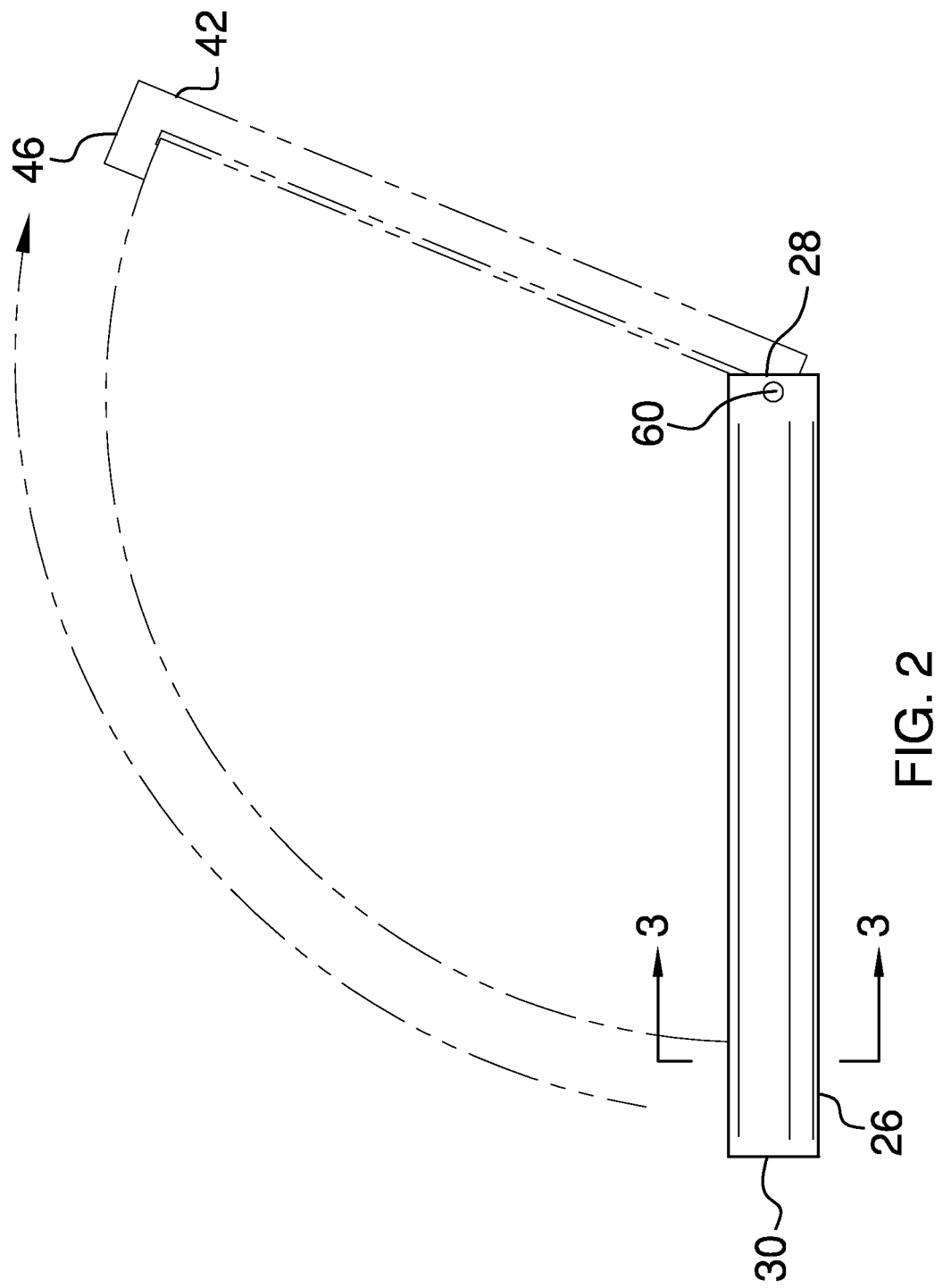

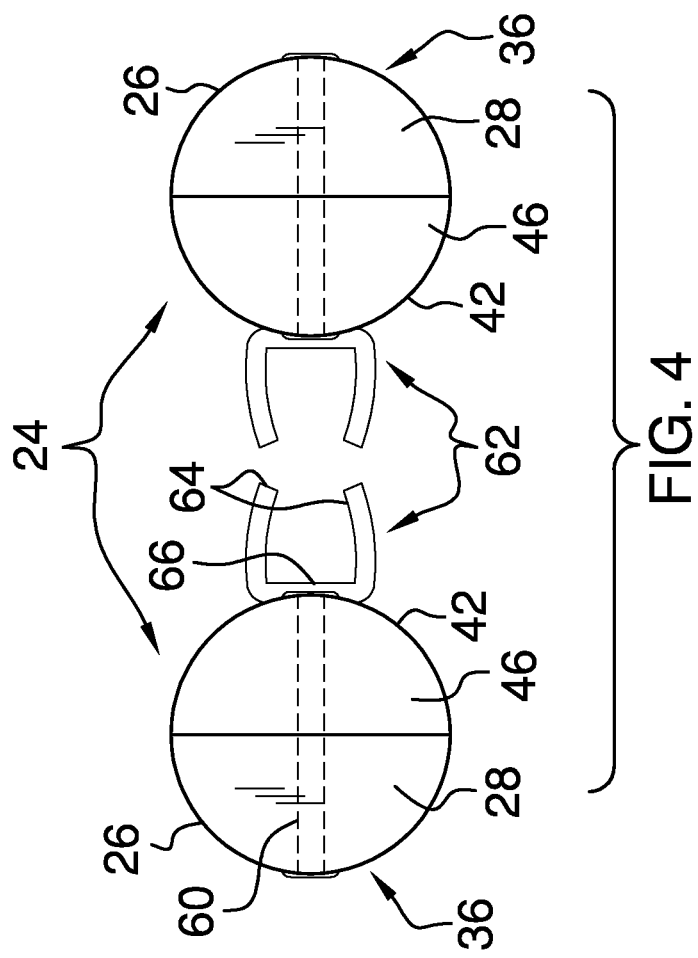
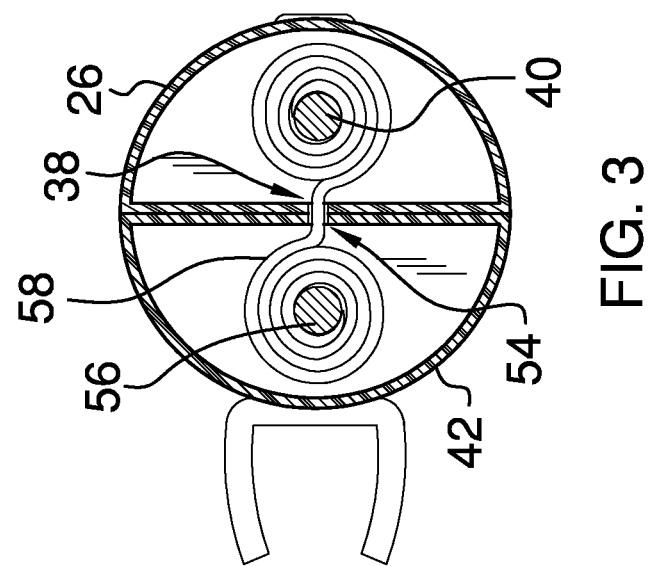

PRIVACY SCREEN SYSTEM

BACKGROUND OF THE DISCLOSURE

Field of the Disclosure

The disclosure relates to screen devices and more particularly pertains to a new screen device for inhibiting an extraneous observer from viewing a display on an electronic device.

SUMMARY OF THE DISCLOSURE

An embodiment of the disclosure meets the needs presented above by generally comprising an electronic device that has a display and the display may be viewed. A pair of screens is provided and each of the screens is removably coupled to the electronic device. Thus, each of the screens inhibits an extraneous observer from viewing the display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a left side view of an embodiment of the disclosure.

FIG. 3 is a cross sectional view taken alone line 3-3 of FIG. 2 of an embodiment of the disclosure.

FIG. 4 is a front view of an embodiment of the disclosure.

DESCRIPTION OF THE PREFERRED EMBODIMENT

Figure 1:
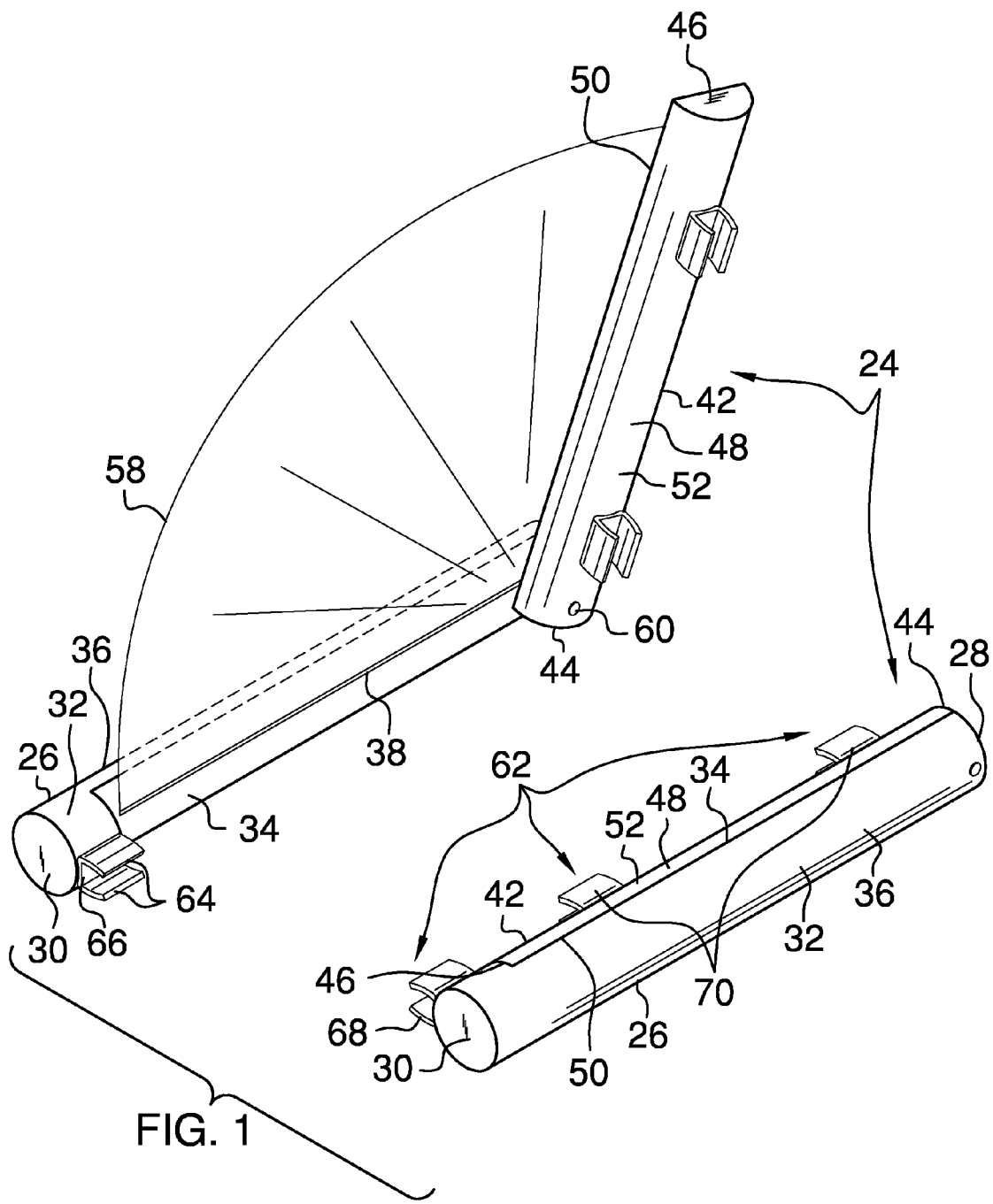
FIG. 1 is a top perspective view of a privacy screen system according to an embodiment of the disclosure.
Figure 5:
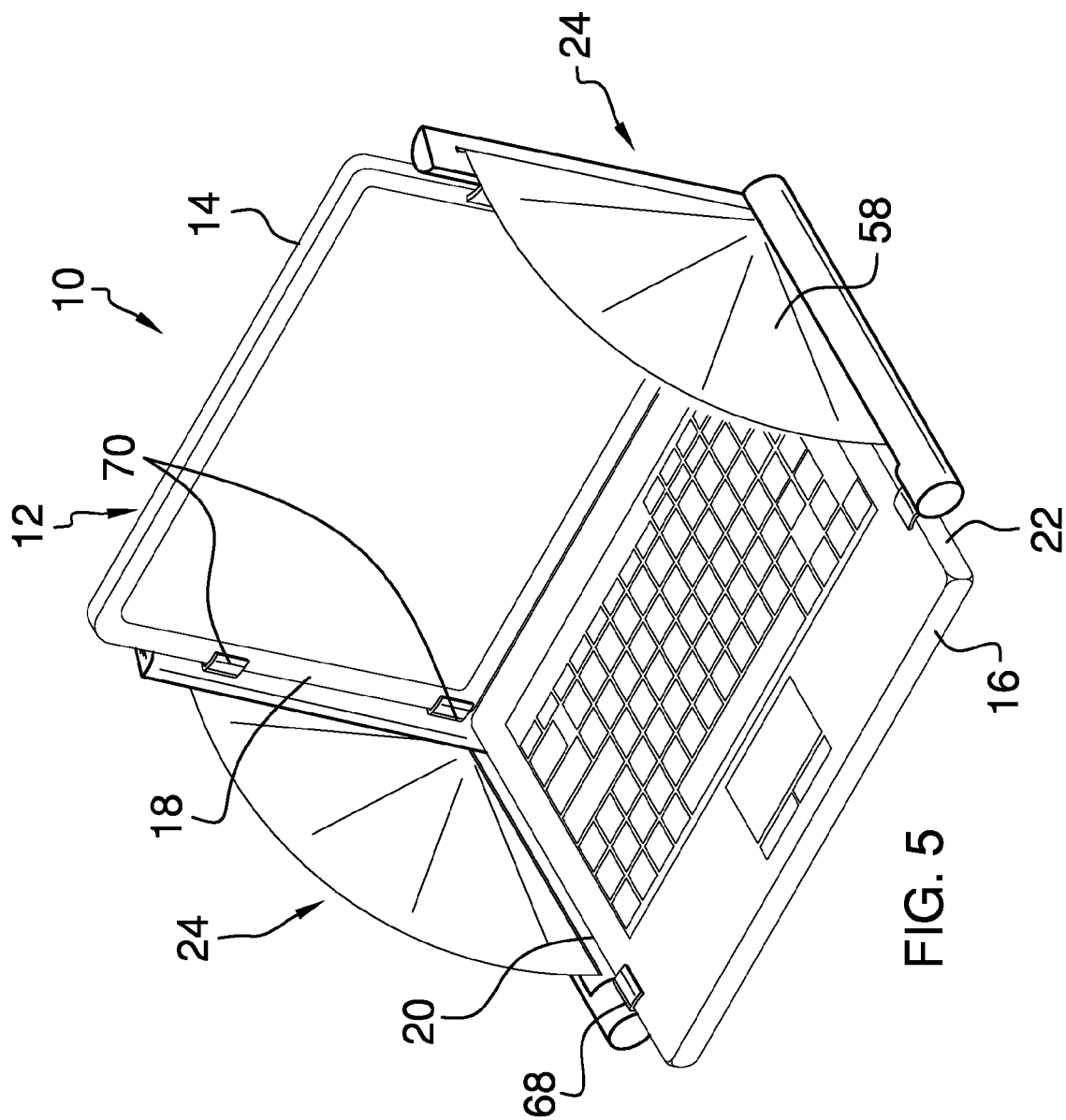
FIG. 5 is a perspective in-use view of an embodiment of the disclosure.

With reference now to the drawings, and in particular to FIGS. 1 through 5 thereof, a new screen device embodying the principles and concepts of an embodiment of the disclosure and generally designated by the reference numeral 10 will be described.

As best illustrated in FIGS. 1 through 5, the privacy screen system 10 generally comprises an electronic device 12 that has a display 14 and a keyboard 16. The display 14 is positionable to be viewed and the electronic device 12 has an outer edge 18. The electronic device 12 may comprise a laptop computer or the like. The outer edge 18 has a first lateral side 20 and a second lateral side 22. A pair of screens 24 is provided and each of the screens 24 is removably coupled to the outer edge 18 of the electronic device 12. Thus, each of the screens 24 inhibits an extraneous observer from viewing the display 14.

Each of the screens 24 comprises a first tube 26 that has a first end 28, a second end 30 and an outer wall 32 extending between the first end 28 and the second end 30. The outer wall 32 has a flat portion 34 and a rounded portion 36. The flat portion 34 extends substantially between the first end 28 and the second end 30. The rounded portion 34 is convexly arcuate with respect to the flat portion 34 such that the first tube 26 is substantially Quonset shaped.

The rounded portion 36 is continuous between the second end 30 and the flat portion 34 such that the second end 30 has circular shape. The first tube 26 is substantially hollow. The flat portion 34 has a first slot 38 extending into an interior of the first tube 26. The first slot 38 is substantially coextensive with the flat portion 34.

A first roller 40 is rotatably positioned within the first tube 26. The first roller 40 extends between the first end 28 and the second end 20. The first roller 40 is biased to rotate in a first direction and the first roller 40 is urgeable to rotate in a second direction. The first roller 40 may comprise a spring loaded roller or the like.

Each of the screens 24 further includes a second tube 42 that has a primary end 44, a secondary end 46 and an exterior wall 48 extending between the primary end 44 and the secondary end 46. The exterior wall 48 has a flat portion 50 and a rounded portion 52. The rounded portion 52 corresponding to the second tube 42 is concavely arcuate with respect to the flat portion 50 corresponding to the second tube 42. Thus, the second tube 42 is substantially Quonset shaped and the second tube 42 is substantially hollow.

The flat portion 50 corresponding to the second tube 42 has a second slot 54 extending into an interior of the second tube 42. The second slot 54 is substantially coextensive with the flat portion 50 corresponding to the second tube 42. The second tube 42 is positionable between a stored position and a deployed position. The flat portion 50 corresponding to the second tube 42 coextensively abuts the flat portion 34 corresponding to the first tube 26. Thus, the first tube 26 and the second tube 42 forms a cylinder having the first slot 38 being aligned with the second slot 54 when the second tube 42 is positioned in the stored position. The second tube 42 extends away from the first tube 26 at a selected angle when the second tube 42 is positioned in the deployed position.

A second roller 56 is rotatably positioned in the second tube 42. The second roller 56 extends between the primary end 44 and the secondary end 46. The second roller 56 is biased to rotate in a first direction and the second roller 56 is urgeable to rotate in a second direction. The second roller 56 may comprise a spring loaded roller or the like.

A sheet 58 is coupled between the first roller 40 and the second roller 56 such that the sheet 58 extends through the first slot 38 and the second slot 54. Each of the first roller 40 and the second roller 56 rotate in the first direction such that the sheet 58 is rolled around each of the first roller 40 and the second roller 56 when the second tube 42 is positioned in the stored position. Each of the first roller 40 and the second roller 56 is urged to rotate in the second direction such that the sheet 58 extends between the first tube 26 and the second tube 42 when the second tube 42 is positioned in the deployed position. The sheet 58 is comprised of an opaque material such that the sheet 58 inhibits light from passing through the sheet 58.

A pin 60 extends laterally through the first tube 26 and the second tube 42. Thus, the second tube 42 is rotatably coupled to the first tube 26. The pin 60 is positioned adjacent to the first end 28 and the primary end 44. The second tube 42 is rotatable about an axis extending through the flat portions 34,50 of each of the first tube 26 and the second tube 42.

A plurality of clips 62 is provided and each of the clips 62 has a pair of arms 64 extending away from a base 66. The arms 64 corresponding to each of the clips 62 is spaced apart from each other. The plurality of clips 62 comprises a first clip 68 and a plurality of second clips 70. The base 66 corresponding to the first clip 68 is coupled to the outer wall 32 of the first tube 26 and the first clip 68 is positioned adjacent to the second end 30. The base 66 corresponding to each of the plurality of second clips 70 is coupled to the exterior wall 48 of the second tube 42 and the second clips 70 are spaced apart from each other.

The arms 64 corresponding to the first clip 68 engages the outer edge 18 corresponding to the keyboard 16 when the second tube 42 is positioned in the deployed position. The arms 64 corresponding to each of the second clips 70 engages the outer edge 18 corresponding to the display 14 when the second tube 42 is positioned in the deployed position. Thus, the sheet 58 extends between the keyboard 16 and the display 14.

In use, the display 14 is positioned in an open position with respect to the keyboard 16. The second tube 42 of each of the screens 24 is positioned in the deployed position. The second tube 42 of each of the screens 24 is manipulated to match an angle formed between the display 14 and the keyboard 16. One of the screens 24 is positioned on the first lateral side 20 of the electronic device 12. One of the screens 24 is positioned on the second lateral side 22 of the electronic device 12. Thus, the extraneous observer is inhibited from viewing the display 14 at a lateral angle with the display 14.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A privacy screen system comprising:
an electronic device having a display wherein said display is configured to be viewed;
a pair of screens, each of said screens being removably coupled to said electronic device wherein each of said screens is configured to inhibit an extraneous observer from viewing said display;
wherein each of said screens comprises a first tube having a first end, a second end and an outer wall extending between said first end and said second end, said outer wall having a first flat portion and a rounded portion, said first flat portion extending substantially between said first end and said second end, said rounded portion being convexly arcuate with respect to said flat portion such that said first tube is substantially semi-circular, said first tube being substantially hollow, said first tube having a first slot;
wherein each of said screens comprises a second tube having a primary end, a secondary end and an exterior wall extending between said primary end and said secondary end, said exterior wall having a flat portion and a rounded portion, said rounded portion corresponding to each said second tube being concavely arcuate with respect to said flat portion corresponding to each said second tube such that each said second tube is substantially semi-circular, each said second tube being substantially hollow;
said flat portion corresponding to each said second tube has a second slot extending into an interior of each said second tube, said second slot being substantially coextensive with said flat portion corresponding to each said second tube; and
each said second tube being positionable between a stored position and a deployed position, said flat portion corresponding to each said second tube abutting said flat portion corresponding to each said first tube such that each said first tube and each said second tube forms a cylinder having said first slot being aligned with said second slot when each said second tube is positioned in said stored position.

2. The system according to claim 1, wherein said first slot extends into an interior of said first tube, said first slot being substantially coextensive with said flat portion.

3. The system according to claim 1, further comprising a first roller being rotatably positioned within said first tube, said first roller extending between said first end and said second end, said first roller being biased to rotate in a first direction, said first roller being urgeable to rotate in a second direction.

4. The system according to claim 1, wherein said second tube extends away from said first tube at an angle when said second tube is positioned in said deployed position.

5. The system according to claim 3, further comprising:
a second roller being rotatably positioned in said second tube, said second roller extending between said primary end and said secondary end, said second roller being biased to rotate in a first direction, said second roller being urgeable to rotate in a second direction.

6. The system according to claim 5, further comprising a sheet being coupled between said first roller and said second roller such that said sheet extends through said first slot and said second slot.

7. The system according to claim 6, wherein each of said first roller and said second roller rotating in said first direction such that said sheet is rolled around each of said first roller and said second roller when said second tube is positioned in said stored position.

8. The system according to claim 7, wherein each of said first roller and said second roller are urged to rotate in said second direction such that said sheet extends between said first tube and said second tube when said second tube is positioned in said deployed position.

9. The system according to claim 1, further comprising
a pin extending laterally through said first tube and said second tube such that said first tube is rotatably coupled to said second tube, said pin being positioned adjacent to said first end and said primary end.

10. The system according to claim 1, further comprising a plurality of clips, each of said clips having a pair of arms extending away from a base, said arms corresponding to each of said clips being spaced apart from each other, said plurality of clips comprising a first clip and a plurality of second clips.

11. The system according to claim 10, further comprising:
said electronic device having a keyboard; and
said base corresponding to said first clip being coupled to said outer wall of said first tube, said first clip being positioned adjacent to said second end, said first clip engaging said outer edge corresponding to said keyboard when said second tube is positioned in a deployed position.

12. The system according to claim 11, wherein said base corresponding to each of said plurality of second clips is coupled to said exterior wall of said second tube, said second clips being spaced apart from each other, each of said second clips engaging said outer edge corresponding to said display when said second tube is positioned in said deployed position such that said sheet extends between said keyboard and said display.

13. A privacy screen system comprising:
an electronic device having a display and a keyboard wherein said display is configured to be viewed, said electronic device having an outer edge; and
a pair of screens, each of said screens being removably coupled to said electronic device wherein each of said screens is configured to inhibit an extraneous observer from viewing said display, each of said screens comprising:
a first tube having a first end, a second end and an outer wall extending between said first end and said second end, said outer wall having a flat portion and a rounded portion, said flat portion extending substantially between said first end and said second end, said rounded portion being convexly arcuate with respect to said flat portion such that said first tube is substantially Quonset shaped, said first tube being substantially hollow, said flat portion having a first slot extending into an interior of said first tube, said first slot being substantially coextensive with said flat portion,
a first roller being rotatably positioned within said first tube, said first roller extending between said first end and said second end, said first roller being biased to rotate in a first direction, said first roller being urgeable to rotate in a second direction,
a second tube having a primary end, a secondary end and an exterior wall extending between said primary end and said secondary end, said exterior wall having a flat portion and a rounded portion, said rounded portion corresponding to said second tube being concavely arcuate with respect to said flat portion corresponding to said second tube such that said second tube is substantially Quonset shaped, said second tube being substantially hollow, said flat portion corresponding to said second tube having a second slot extending into an interior of said second tube, said second slot being substantially coextensive with said flat portion corresponding to said second tube, said second tube being positionable between a stored position and a deployed position, said flat portion corresponding to said second tube abutting said flat portion corresponding to said first tube such that said first tube and said second tube forms a cylinder having said first slot being aligned with said second slot when said second tube is positioned in said stored position, said second tube extending away from said first tube at an angle when said second tube is positioned in said deployed position,
a second roller being rotatably positioned in said second tube, said second roller extending between said primary end and said secondary end, said second roller being biased to rotate in a first direction, said second roller being urgeable to rotate in a second direction,
a sheet being coupled between said first roller and said second roller such that said sheet extends through said first slot and said second slot, each of said first roller and said second roller rotating in said first direction such that said sheet is rolled around each of said first roller and said second roller when said second tube is positioned in said stored position, each of said first roller and said second roller being urged to rotate in said second direction such that said sheet extends between said first tube and said second tube when said second tube is positioned in said deployed position,
a pin extending laterally through said first tube and said second tube such that said first tube is rotatably coupled to said second tube, said pin being positioned adjacent to said first end and said primary end, and
a plurality of clips, each of said clips having a pair of arms extending away from a base, said arms corresponding to each of said clips being spaced apart from each other, said plurality of clips comprising a first clip and a plurality of second clips, said base corresponding to said first clip being coupled to said outer wall of said first tube, said first clip being positioned adjacent to said second end, said base corresponding to each of said plurality of second clips being coupled to said exterior wall of said second tube, said second clips being spaced apart from each other, said first clip engaging said outer edge corresponding to said keyboard when said second tube is positioned in said deployed position, each of said second clips engaging said outer edge corresponding to said display when said second tube is positioned in said deployed position such that said sheet extends between said keyboard and said display.

* * * * *